United States Patent [19]

Viteri

[11] Patent Number: 5,680,764
[45] Date of Patent: Oct. 28, 1997

[54] CLEAN AIR ENGINES TRANSPORTATION AND OTHER POWER APPLICATIONS

[75] Inventor: Fermin Viteri, Sacramento, Calif.

[73] Assignee: Clean Energy Systems, Inc., Sacramento, Calif.

[21] Appl. No.: 477,114

[22] Filed: Jun. 7, 1995

[51] Int. Cl.[6] .................................................. F01B 21/04
[52] U.S. Cl. .............................. 60/716; 60/626; 60/39.6; 60/683
[58] Field of Search .......................... 60/716, 626, 39.6, 60/672, 683

[56] References Cited

U.S. PATENT DOCUMENTS

| | | | |
|---|---|---|---|
| 2,514,875 | 7/1950 | Kollsman | 60/41 |
| 2,748,599 | 6/1956 | Keller | 73/147 |
| 3,256,691 | 6/1966 | Dobossy | 60/59 |
| 3,262,635 | 7/1966 | Smuland | 230/116 |
| 3,635,572 | 1/1972 | Dee | 415/79 |
| 3,699,681 | 10/1972 | Frutschi | 60/59 T |
| 3,797,247 | 3/1974 | Schwartzman | 60/59 T |
| 3,995,431 | 12/1976 | Schwartzman | 60/684 |
| 4,403,477 | 9/1983 | Schwarzenbach | 60/659 |
| 4,835,979 | 6/1989 | Murry et al. | 62/172 |
| 4,936,098 | 6/1990 | Nakhamkin | 60/652 |
| 5,025,631 | 6/1991 | Garbo | 60/683 |
| 5,224,339 | 7/1993 | Hayes | 60/39.43 |
| 5,255,507 | 10/1993 | Gounder | 60/683 |

FOREIGN PATENT DOCUMENTS

| | | |
|---|---|---|
| 634006 | 3/1950 | United Kingdom. |
| WO90/00229 | 1/1990 | WIPO. |

OTHER PUBLICATIONS

Davies, M.; The Physical Principles of Gas Liquefaction and Low Temperature Rectification; Longmans, Green and Co, pp. 117, 118, 178 (1949).

Wood, B.; Applications of Thermodynamics, 2nd Ed.; Addison-Wesley; Jun. 1982; pp. 66,67.

HispanoSuiza; Catalog page; Diesel & Gas Turbine Worldwide Catalog; (1984); entire page.

Wilson, D.; Design of High Efficiency Turbomachinery and Gas Turbines; MIT Press; (1984); pp. 101-105, 108-113, 122, 123, 126-129.

Shepherd, D.; Introduction to the Gas Turbine; D. Van Nostrand Co.; pp. 16-19, ?, 70-73; unknown date.

(List continued on next page.)

*Primary Examiner*—Denise L. Ferensic
*Assistant Examiner*—Alfred Basichas
*Attorney, Agent, or Firm*—Bradley P. Heisler

[57] ABSTRACT

A low or no pollution engine is provided for delivering power for vehicles or other power applications. The engine has an air inlet which collects air from a surrounding environment. The air is compressed through multiple stages of compression with intercoolers between the compressors. The air is then purged of any constituents which have a relatively high freezing point in a scrubber and then expanded in a turboexpander which causes the air to be cooled down to near air liquifaction temperatures. The air is then passed through a rectifier, where nitrogen is removed from the air. The remaining air is substantially entirely oxygen, which is then compressed and routed to a gas generator. The gas generator has an igniter and inputs for the high pressure oxygen and a high pressure hydrogen containing fuel, such as hydrogen or methane. The fuel and oxygen are combusted within the gas generator, forming water and possibly carbon dioxide. Water is also delivered into the gas generator to control a temperature of the combustion products. The combustion products are then expanded through a power generating device, such as a turbine or piston expander to deliver output power for operation of a vehicle or other power uses. The combustion products, steam and carbon dioxide, are then passed through a condenser where the steam is condensed and the carbon dioxide is collected or discharged. A portion of the water is discharged into the surrounding environment and the remainder is routed back to the gas generator.

20 Claims, 10 Drawing Sheets

NONPOLLUTING HYBRID ENGINE
USING AN ELECTRIC MOTOR DRIVE AND
A STEAM/CO2 RANKINE POWER CYCLE
WITH O2 LIQUEFACTION

OTHER PUBLICATIONS

Kidwell, J., et al.; Advanced Gas Turbine Technology Update AGT101; American Society of Mech. Engrs. paper; entire paper; unknown date.

English, R., et al.; Comparison of Gas–Turbine Cycles for Space Applications; ARS Journal; Nov. 1960; pp. 1097, 1098.

Berner, J., et al.; A Preliminary Study of the Modified Ericsson for Space Power; Society of Automotive Engrs.; 1985, pp. 1.452–1.458.

Van Wylen, G., et al.; Fundamentals of Classical Thermodynamics; John Wiley & Sons; 1985; pp. 333–335.

Lamm, M.; The Big Engine That Couldn't; American Heritage of Invention and Technology; Winter 1993; entire article.

Faires, V.; Applied Thermodynamics; Macmillian, 1947; pp. 72, 73, 97, 68, 69, 71 and 128.

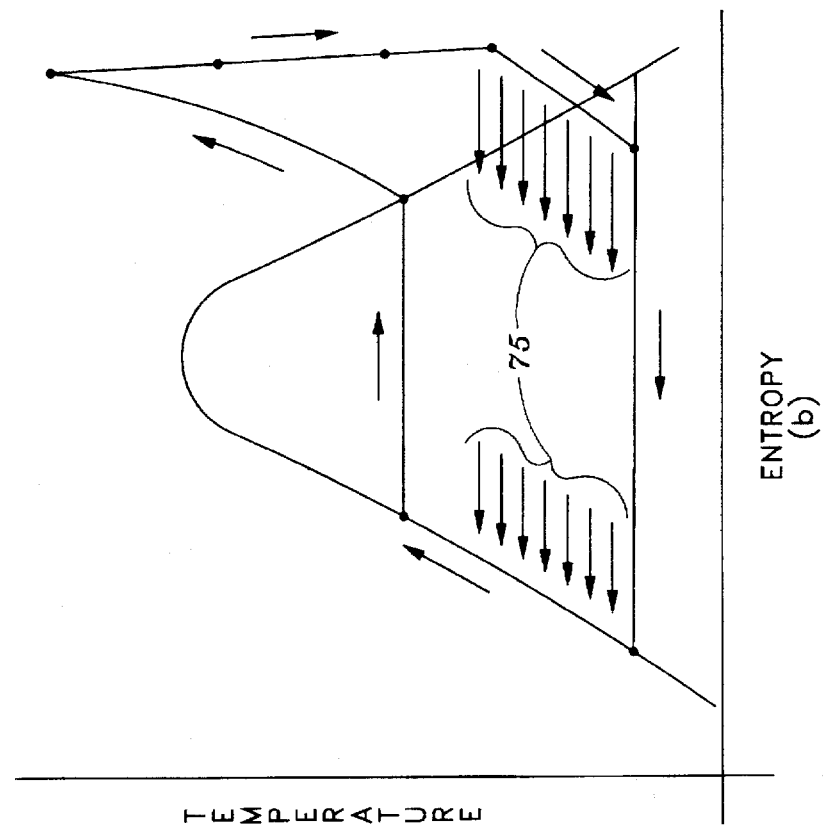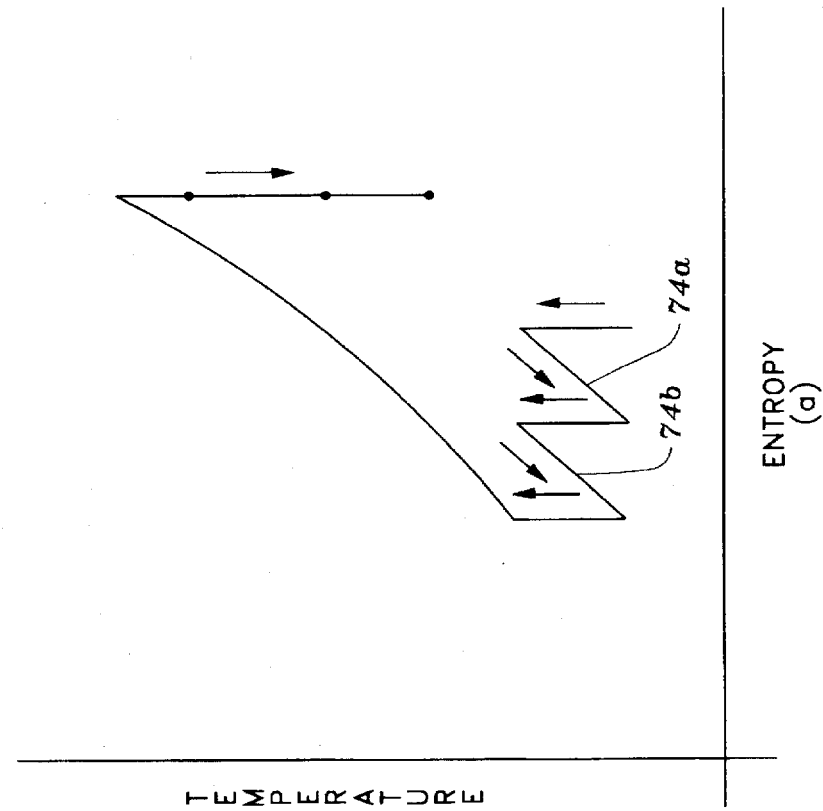
Fig. 4

CLEAN AIR ENGINES TRANSPORTATION AND OTHER POWER APPLICATIONS

FIELD OF THE INVENTION

This invention contains environmentally clean engine designs that emit zero or very low pollutant levels during operation. The CLEAN AIR ENGINE (CLAIRE) invention is directly applicable to transportation type vehicles including automobiles, trucks, trains, ships and stationary stand by power generation applications. The designs feature hybrid, dual cycle and single cycle engines.

BACKGROUND OF THE INVENTION

The current art in generating power for transportation purposes basically utilize the internal combustion gas or diesel engine. These engines burn hydrocarbon fuels with air which contains (by weight) 23.1% oxygen, 75.6% nitrogen and the remaining 1.3% in other gases. The emissions resulting from the combustion of fuels for internal combustion engines (gasoline or diesel), with air contain the following pollutants that are considered damaging to our air environment. These smog causing pollutants, are: total organic gases (TOG); reactive organic gases (ROG); carbon monoxide (CO); oxides of nitrogen ($NO_x$); oxides of sulfur ($SO_x$); and particulate matter (PM). Approximately one half of the total pollutants emitted by all sources of air pollution in California are generated by road vehicles (Emission Inventory 1991, State of California Air Resources Board, prepared January 1994). The major source of this vehicle pollution comes from passenger cars and light to medium duty trucks.

No near term solutions appear in sight to drastically reduce the vast amount of air pollutants emitted by the many millions of automobiles and trucks operating today. Based on the State of California Air Resources Board study, the average discharge per person in California of the air pollutants from mobile vehicles, monitored by this agency during 1991 and reported in 1994, was approximately 1.50 lb/day per person. With a nationwide population of over 250,000,000 people, this data extrapolates to over 180,000 tons of air borne emissions per day being discharged in the USA by mobile vehicles. Also, the number of cars and miles that are being driven continue to increase, further hampering efforts to reduce smog causing pollutants.

Allowable emission thresholds are rapidly tightening by Federal and State mandates. These allowable emission reductions are placing severe demands on the transportation industry to develop new and lower emission power systems such as electric or hybrid vehicles that utilize both an electric motor and a gas turbine or internal combustion (IC) engine. In hybrid vehicles, the gas turbine or IC engine can be used directly to drive the vehicle when the electric motor is not in use, due to low battery charge (long travel distances), or it can be used indirectly. In indirect use, vehicle runs off of batteries powering an electric motor until the batteries run out of power. The gas turbine or IC engine is then connected to an alternator to drive the electric motor until the electric motor battery is recharged, either by the gas turbine or IC engine or a stationary source of electricity. This type of hybrid vehicle does not drastically reduce the air pollution emission problem.

Although considerable effort is being directed at improving the range of electric zero emission vehicles (ZEV) by developing higher energy capacity, lower cost storage batteries, the emission problem is been transferred from the vehicle to the electric power generating plant, which is also being Federally mandated (Clean Air Act Amendments of 1990) to reduce the same air toxic emissions as those specified for automobiles and trucks.

Other energy sources being developed to solve the emissions problem, by exploiting non-combustible energy sources include fuel cells and solar cells. Developers are solving many of the technological and economic problems of these alternate sources. However, widespread use of these energy sources for vehicles does not appear to yet be practical.

SUMMARY OF THE INVENTION

This invention provides a means for developing a zero pollution vehicle (ZPV) and other transportation power systems (i.e. rail and ship), comparable to the environmental cleanliness of zero emission electric vehicles (ZEV) and utilizes various thermal cycles. The zero pollution is achieved by removing the harmful pollutants from the incoming fuel and oxidizer reactants prior to mixing and burning them in a gas generator or combustion chamber. Sulfur, sulfides and nitrogen are major pollutants that must be removed from the candidate fuels: hydrogen, methane, propane, purified natural gas, and light alcohols such as ethanol and methanol. Since air contains 76% nitrogen by weight, it becomes a major source of pollution that also requires removal prior to combining it with the clean fuel. Cleansing of the fuel is straightforward and requires no further elaboration. The separation of the oxygen from the nitrogen in the air, however, is accomplished most efficiently by the liquefaction of air and gradual separation of the two major constituents, oxygen and nitrogen, by means of a rectifier (to be described later in more detail). The separation of the gases relies on the two distinct boiling points for oxygen (162° R) and for nitrogen 139° R at atmospheric pressure. Air liquefies at an intermediate temperature of 142° R.

One embodiment of this invention consists of a hybrid power system that combines a Rankine cycle thermal cycle with an auxiliary electric motor for startup and chill-down requirements. The thermal power cycle of the engine begins by compressing ambient air to high pressures, cooling the air during compression and during the expansion to liquid air temperatures in a rectifier where separation of the oxygen and nitrogen takes place. The cold gaseous nitrogen generated is used to cool the incoming air and then discharged to the atmosphere at near ambient temperature. Simultaneously, the cold gaseous or liquid oxygen generated by the rectifier is pressurized to gas generator pressure levels and delivered to the gas generator at near ambient temperature. Fuel, gaseous or liquid, from a supply tank is pressurized to the pressure level of the oxygen and also delivered to the gas generator where the two reactants are combined at the stoichiometric mixture ratio to achieve complete combustion and maximum temperature hot gases (6500° R). These hot gases are then diluted with water downstream in a mixing section of the gas generator until the resulting temperature is lowered to acceptable turbine inlet temperatures (2000° R).

The drive gas generated from this mixing process consists of high purity steam, when using oxygen and hydrogen as the fuel, or a combination of high purity steam and carbon dioxide ($CO_2$), when using oxygen and light hydrocarbon fuels (methane, propane, methanol, etc.). Following the expansion of the hot gas in the turbine, which powers the vehicle, the steam or steam plus $CO_2$ mixture are cooled in a condenser to near or below atmospheric pressure where the steam condenses into water, thus completing a Rankine cycle. Approximately 75% of the condensed water is recirculated to the gas generator while the remainder is used for cooling and discharged to the atmosphere as warm water vapor. When using light hydrocarbons as the fuel, the gaseous carbon dioxide remaining in the condenser is compressed to slightly above atmospheric pressure and either converted to a solid or liquid state for periodic removal, or the gas can be discharged into the atmosphere when such discharge is considered non-harmful to the local air environment.

Since this thermal cycle requires time to cool the liquefaction equipment to steady state low temperatures, an electric motor, driven by a small auxiliary battery, can be used to power the vehicle and initiate the Rankine cycle until chill-down of the liquefaction equipment is achieved. When chill-down is complete the thermal Rankine engine, connected to an alternator, is used to power the vehicle and recharge the auxiliary battery.

The combination of these two power systems, also referred to as a hybrid vehicle, emit zero pollution in either mode of operation. In addition, the electric motor battery is charged by the zero pollution thermal Rankine cycle engine itself and thus does not require a separate electric power generating plant for recharge. This reduces the power demand from central power stations and also reduces a potential source of toxic air emissions.

In place of the electric drive motor and battery, the Rankine cycle engine, with the addition of a few control valves, can also be operated as a minimally polluting open Brayton cycle, burning fuel and incoming air to power the vehicle during the period necessary to allow the Rankine cycle engine liquefaction equipment time to chill-down. This feature is another embodiment of this invention.

The zero pollution Rankine cycle engine can also be used in a single cycle thermal mode for vehicles with long duration continuous duty such as heavy trucks, trains, ships and stationary power generation plants where the chill-down time is not critical to the overall operational cycle.

The adaptation of the Otto and Diesel thermal cycles to a low-polluting hybrid engine are also included as embodiments of this invention. By using these thermal cycles, the need for a condenser and recirculating water system are eliminated. Low temperature steam or steam/carbon dioxide gases are recirculated as the working fluid and therefore replace the function of the recirculating water quench of the Rankine cycle embodiments previously discussed.

BRIEF DESCRIPTION OF THE DRAWINGS

Further features and advantages of this invention, which are defined by the appended claims, will become apparent from consideration of the following drawings:

FIG. 4a is a plot of Temperature v. Entropy for the working fluid illustrating the first of two cycles used in the dual mode engine of FIG. 3. This cycle is an open Brayton with inter-cooling between compressor stages (Mode I).

FIG. 4b is a plot of Temperature v. Entropy for the working fluid illustrating the second cycle used in the dual mode engine of FIG. 3. This cycle is a Rankine with regeneration, (Mode II).

DESCRIPTION OF THE PREFERRED EMBODIMENTS

Figure 1:
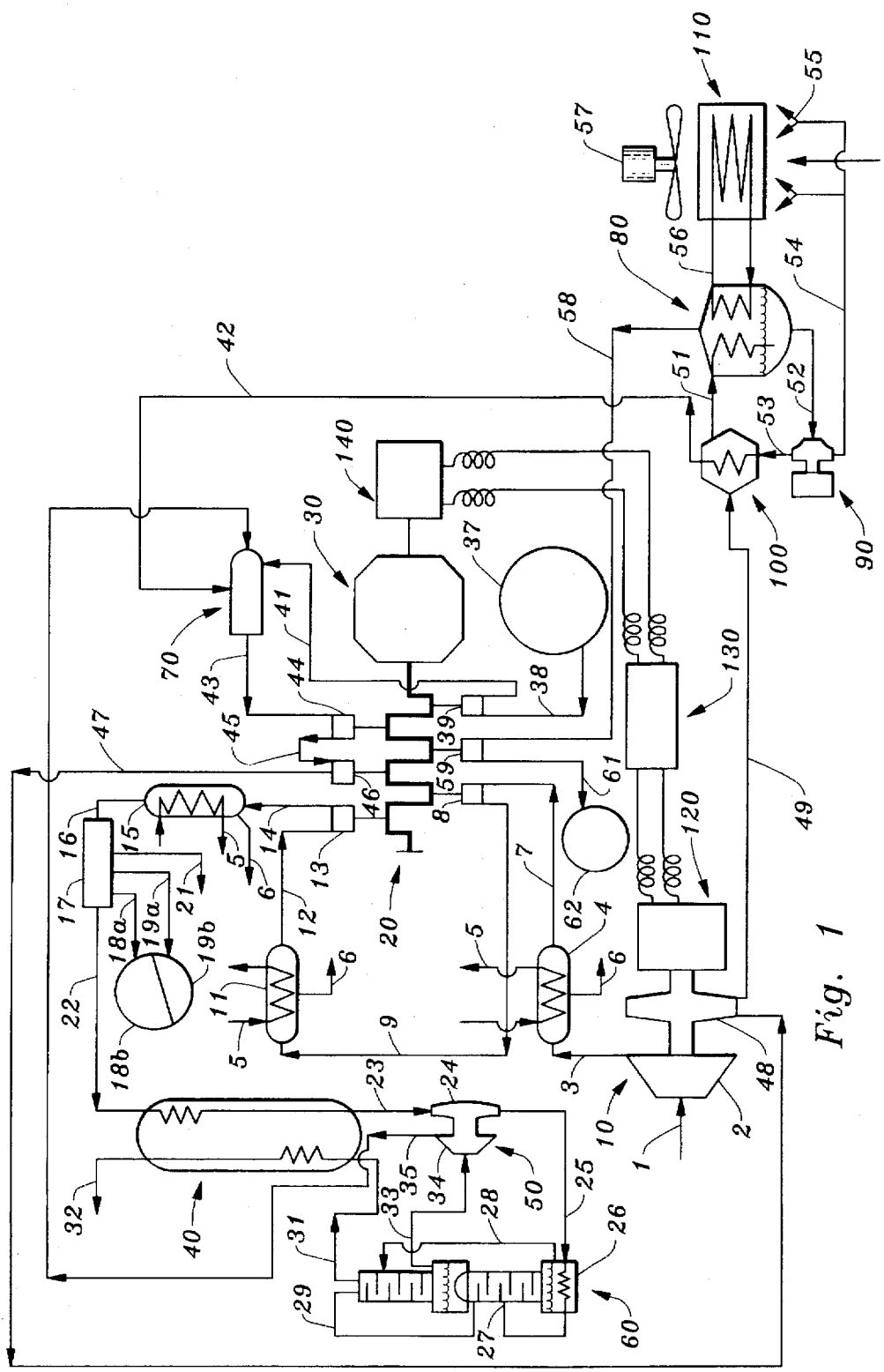
FIG. 1 is a schematic illustrating an embodiment of this invention and its elements, along with their connectivity. This embodiment constitutes a pollution-free hybrid power system for vehicular and other applications. The fuel reactant is a light hydrocarbon type such as methane propane, purified natural gas, and alcohols (i.e. methanol, ethanol).

According to the first embodiment of the present invention, a zero pollution Rankine cycle thermal engine operating in parallel with a zero emissions electric motor (also referred to as a hybrid engine) is illustrated in FIG. 1. The Rankine engine consists of a dynamic turbocompressor 10, a reciprocating engine 20, a power transmission 30, a heat exchanger 40, a turboexpander 50, a rectifier 60, a gas generator 70, a condenser 80, a recirculating water feed pump 90, a water heater 100 and a condenser coolant radiator 110. The electric engine consists of an alternator 120, a battery 130 and electric motor 140.

Hybrid engine operation begins by starting the electric motor 120 using the battery 130 as the energy source. The electric motor 120 drives the reciprocating engine 20 through the power transmission 30 and thereby initiates the start of the thermal engine that requires a chill-down period for the liquefaction equipment consisting of heat exchanger 40, turboexpander 50 and rectifier 60.

Activation of the thermal engine initiates the compression of ambient temperature air from a surrounding environment entering the dynamic compressor 2 through an air inlet duct 1. The compressor 2 raises the air to the design discharge pressure. The air then exits through duct 3 into intercooler 4 where the heat of compression is removed by external cooling means 5 (i.e. air, water, Freon, etc.). Condensed water vapor from the air is tapped-off by drain 6. After the air exits intercooler 4 through duct 7, at a temperature equal to the compressor inlet, it enters the reciprocating compressor 8 and is raised to the design discharge pressure. The air exits through duct 9 into intercooler 11 and is again cooled to the inlet temperature of the compressor. This compression/cooling cycle is repeated as the air exits intercooler 11 through duct 12 and enters reciprocating compressor 13, then exits through duct 14, enters intercooler 15 and exits through duct 16, to complete the air pressurization.

The high pressure; ambient temperature air then enters the scrubber 17 where any gases or fluids that could freeze during the subsequent liquefaction are removed. These gases and liquids include carbon dioxide (duct 18$a$ and storage tank 18$b$), oil (line 19$a$ and storage tank 19$b$) and water vapor (tap off drain 21). The oil can be from a variety of sources, such as leakage from the air compression machinery. The dry air then exits through duct 22 and enters heat exchanger 40 where the air is cooled by returning low temperature gaseous nitrogen.

The dry air is now ready to pass through an air treatment device for the separation of nitrogen out of the air and to provide nitrogen free oxygen for combustion as discussed below. The dry air will contain, by weight, 23.1% oxygen, 75.6% nitrogen, 1.285% argon and small traces of hydrogen, helium, neon, krypton and xenon (total of 0.0013%). Argon has a liquefaction temperature of 157.5° R, which lies between the nitrogen and oxygen boiling points of 139.9° R and 162.4° R respectively. Therefore argon, which is not removed, will liquefy during the liquefaction process. The remaining traces of gases hydrogen, helium and neon are incondensable at temperatures above 49° R while krypton and xenon will liquefy; however, the trace amounts of these latter gases is considered insignificant to the following air liquefaction process.

The dry air then exits through duct 23 and enters the turboexpander 24 where the air temperature is further reduced to near liquid air temperature prior to exiting duct 25 and enters the rectifier 60 (a two column type design is shown). Within the rectifier, if not before, the air is cooled to below the oxygen liquefaction temperature. Preferably, a two column type rectifier 60 is utilized such as that described in detail in the work: *The Physical Principles of Gas Liquefaction and Low Temperature Rectification*, Davies, first (published by Longmans, Green and Co. 1949).

The air exits from the lower rectifier heat exchanger 26 through duct 27 at liquid air temperature and enters the rectifier's lower column plates where the oxygen/nitrogen separation is initiated. Liquid with about 40% oxygen exits through duct 28 and enters the upper rectifier column where a higher percentage oxygen concentration is generated. Liquid nitrogen at 96% purity is recirculated from the lower rectifier column to the upper column by means of duct 29. Gaseous nitrogen at 99% purity (1% argon) exits through duct 31 and enters heat exchanger 40 where cooling of the incoming air is performed prior to discharging through duct 32 to the atmosphere at near ambient temperature and pressure. Gaseous or liquid oxygen at 95% purity (5% argon) exits through duct 33 and enters the turboexpander compressor 34 where the oxygen is pressurized to the design pressure. The high pressure oxygen then exits through duct 35 and enters the gas generator 70.

A light hydrocarbon fuel (methane, propane, purified natural gas and light alcohols such as ethanol and methanol) exits the fuel supply tank 37 through duct 38 and enters the reciprocating engine cylinder 39 where the fuel is raised to the design discharge pressure. The fuel then exits through duct 41 and enters the gas generator 70 to be mixed with the incoming oxygen at the stoichiometric mixture ratio to achieve complete combustion and maximum hot gas temperature (approximately 6500° R). The gas generator includes an ignition device, such as a spark plug, to initiate combustion. While the gas generator 70 is the preferred form of fuel combustion device for this embodiment, other fuel combustion devices could also be used, such as those discussed in the alternative embodiments below. The products of combustion of these reactants result in a high purity steam and carbon dioxide gas and a small amount of gaseous argon (4%).

Following the complete combustion of the high temperature gases, recirculating water is injected into the gas generator 70 through line 42 and dilutes the high temperature gases to a lower temperature drive gas acceptable to the reciprocating engine (approximately 2000° R). This water influx also increases a mass flow rate of combustion products available for expansion and power generation. The drive gas then exits the gas generator 70 through discharge duct 43, enters reciprocating cylinder 44, expands and provides power to the power transmission 30. Other combustion product expansion devices can replace the reciprocating cylinder 44, such as the dynamic turbines discussed in the sixth embodiment below. The gas exits through duct 45, enters the second cylinder 46, expands and also provides power to the power transmission; the gas exits through duct 47 and powers the dynamic turbine 48 which drives the centrifugal compressor 2, which was driven by the electric motor 140 during start-up, and the alternator 120 to recharge the battery 130.

The gas then exits through duct 49, enters the water heater 100 where residual heat in the gas is transferred to the recirculating water being pumped by pump 90, the water heater gas exits through duct 51, enters the condenser 80 at near or below atmospheric pressure, where condensation of the steam into water and separation of the carbon dioxide takes place. The condensed water exits through line 52, enters the pump 90 where the pressure of the water is raised to the gas generator 70 supply pressure level. A major portion of the pump 90 discharge water exits through line 53, enters the water heater 100 where heat is transferred from the turbine 48 exhaust gas and then exits through line 42 for delivery to the gas generator 70. The remaining water from the discharge of pump 90 exits through duct 54 and is sprayed through nozzles 55 into radiator 110 (evaporative cooling). Coolant for the condenser gases is recirculated through duct 56 to the radiator 110 where heat is rejected to atmospheric air being pumped by fan 57.

The gaseous carbon dioxide, remaining after the condensation of the steam, exits the condenser 80 through duct 58 and enters the reciprocating cylinder 59, (when the condenser pressure is below atmospheric) compressed to slightly above atmospheric pressure and discharged through duct 61. The compressed carbon dioxide can be stored in storage tank 62 and converted to a solid or liquid state for periodic removal; or the gas can be discharged into the atmosphere when such expulsion is permitted.

It should be noted that this hybrid engine generates its own water requirements upon demand and thus eliminates the freezing problem of a steam Rankine cycle in a cold (below freezing) environment. Also, the engine generates its oxidizer requirements on demand and thus eliminates many safety concerns regarding oxygen storage.

Figure 2:
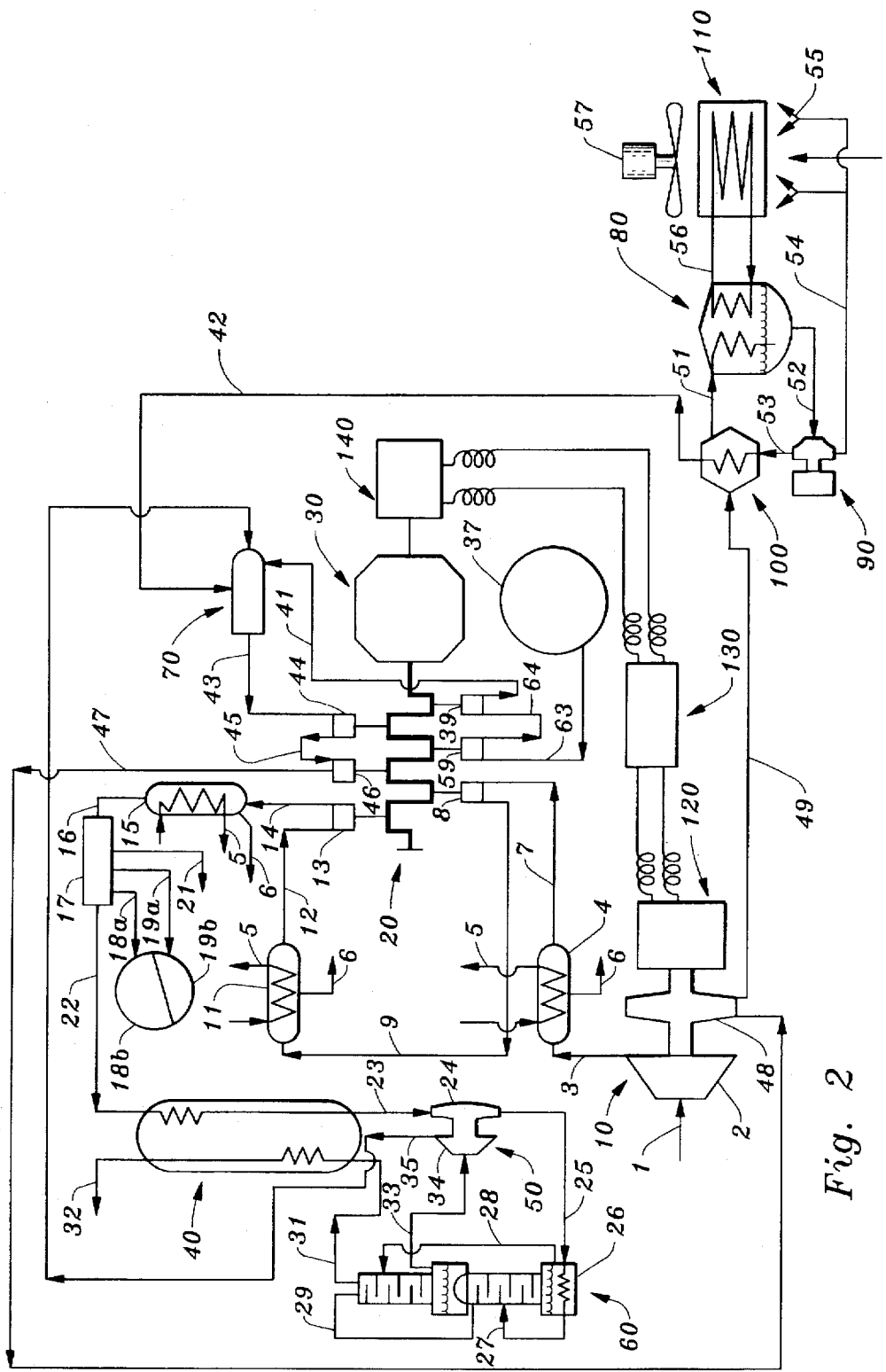
FIG. 2 is a schematic illustrating an embodiment of this invention which is also a pollution-free hybrid power system for vehicular and other applications where the fuel is gaseous hydrogen.

A second embodiment of this invention, illustrated in FIG. 2, features a hybrid engine when using hydrogen in place of a hydrocarbon fuel. When using hydrogen as the fuel no carbon dioxide is generated and only high purity steam exits from the gas generator 70. Consequently all systems related to carbon dioxide are deleted, and no other changes are basically required. However, to maintain the same six cylinder engine of FIG. 1, the hydrogen fuel FIG. 2 exits the fuel supply tank 37 through duct 63, enters reciprocating engine cylinder 59, exits through duct 64, enters reciprocating engine cylinder 39, exits through duct 41 and is delivered to the gas generator 70. This permits two stages of compression for the low density hydrogen.

Figure 3:
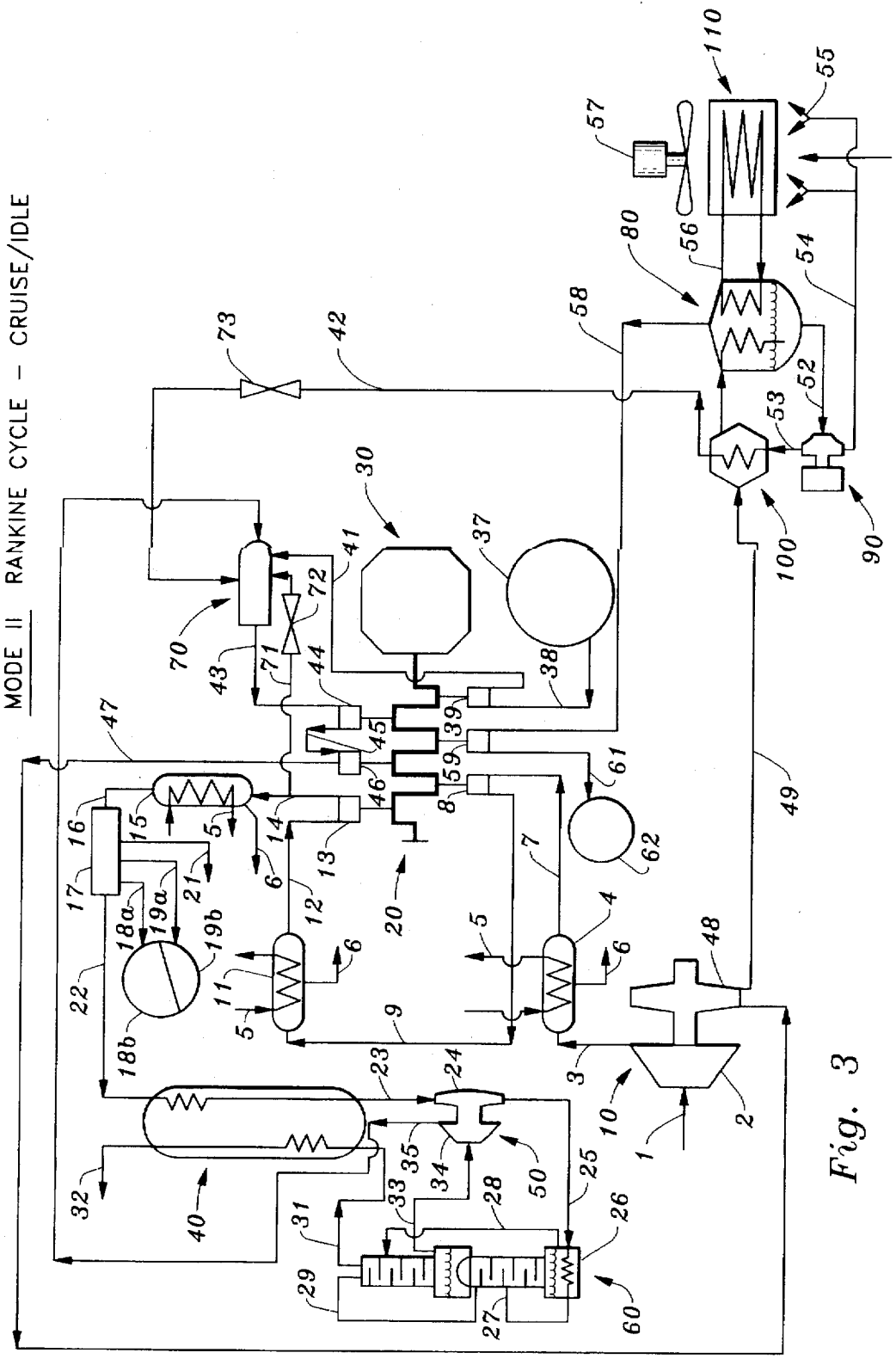
FIG. 3 is a schematic illustrating an embodiment of this invention which is a pollution-free power system for vehicular and other applications during cruise and continuous duty. During start-up and a short period thereafter, the engine runs in an open Brayton cycle mode and thus emits some pollutants.

A third embodiment of this invention, illustrated in FIG. 3, features a dual cycle engine where a Brayton cycle is used for start-up and chill-down of the air liquefaction equipment (Mode I) and a Rankine cycle is used for cruise, idle and continuous duty (Mode II). To incorporate this feature, high pressure air is tapped-off from cylinder 13 (air pressurization as previously described for embodiment one) by means of bypass air duct 71 and modulated by valve 72. Also, recirculating water to the gas generator is modulated by means of valve 73 to control the combustion temperature of the fuel and oxygen and the exit temperature of the gaseous mixture being delivered to power the cycle through duct 43.

The thermodynamic cycles for these two operating Modes are illustrated in FIG. 4a and FIG. 4b. The working fluid for power cycle operation in Mode I consists of steam, carbon dioxide and gaseous air. When operating in Mode II the working fluid (as discussed in embodiment one and two) consists of steam and carbon dioxide when using hydrocarbon fuel and steam only when using hydrogen.

An open Brayton cycle, illustrated in FIG. 4a, with two stages of intercooling the compressed air, 74a, and 74b, is used to power the engine during Mode I and initiates the chill-down of the liquefaction equipment for subsequent Mode II operation of the Rankine cycle with regeneration 75, illustrated in FIG. 4b. Note that this embodiment eliminates the need for an electric motor, battery and alternator.

Figure 5:
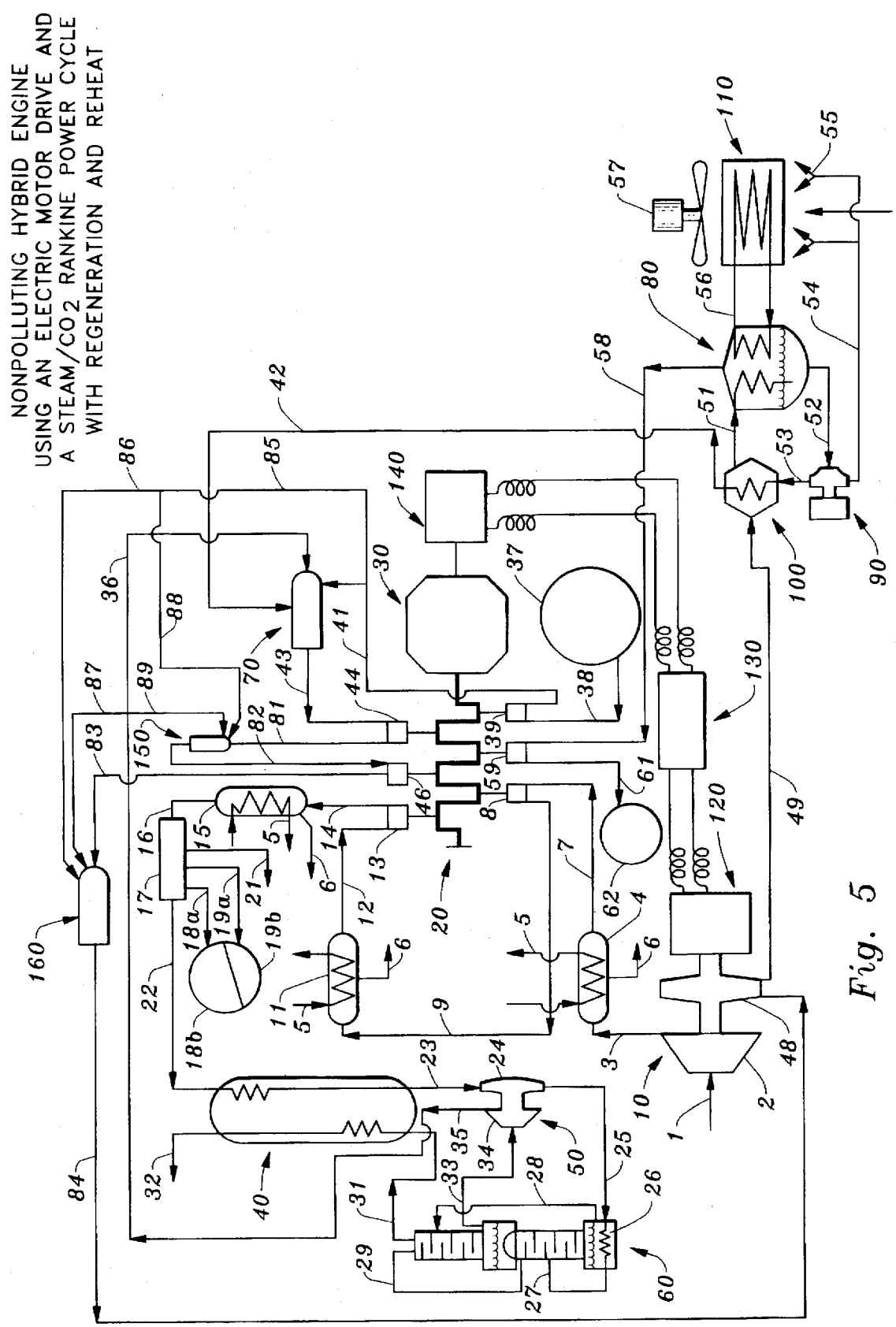
FIG. 5 is a schematic illustrating an embodiment of this invention and its interconnecting elements. This embodiment constitutes a pollution-free hybrid power system for vehicular and other applications similar to that of FIG. 1 but with the addition of two reheaters to the power cycle for improved performance. The fuel reactant for this cycle is a light hydrocarbon.

A fourth embodiment of this invention, illustrated in FIG. 5, includes all the elements of the first embodiment and adds two reheaters 150 and 160 to improve the performance of this engine. While two reheaters 150, 160 are shown, any number of reheaters can be utilized depending on the requirements of each specific application.

The engine operates as described for the first embodiment but with the following changes. Hot gases exiting reciprocating cylinder 44 exit through duct 81, enter the reheater 150 where additional light hydrocarbon fuel and oxygen is injected through ducts 88 and 89 respectively. The heat of combustion of these reactants within the reheater 150 raises the incoming gas temperature to the level of the gas generator 70 output. The reheated gas then exits reheater 150 through duct 82, enters reciprocating cylinder 46, expands and exits through duct 83 and enters reheater 160 where additional oxygen and fuel is injected. The heat of combustion of these reactants within the reheater 160 again raises the incoming gas temperature to the same level as at the gas generator 70 output. The heated gas then exits through duct 84 and enters the dynamic turbine 48, as described previously in the first embodiment. Fuel for the reheater 160 is supplied through duct 86. The oxygen is supplied through duct 87.

Figure 6:
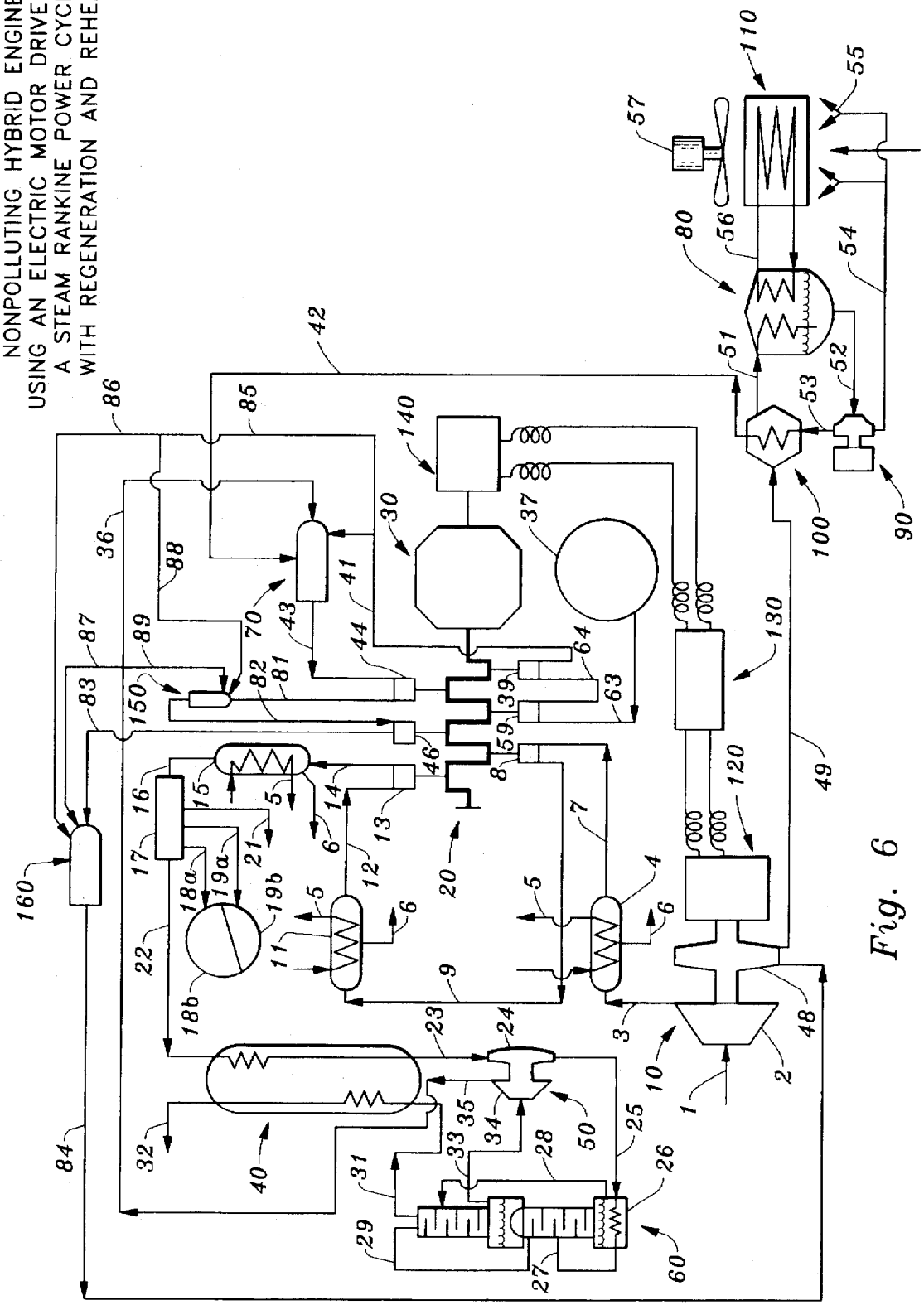
FIG. 6 is a schematic illustrating an embodiment of this invention and its interconnecting elements. This embodiment constitutes a pollution-free hybrid power system similar to that of FIG. 2 but with the addition of two reheaters to the power cycles for improved performance. The fuel reactant for this cycle is hydrogen.
Figure 7:
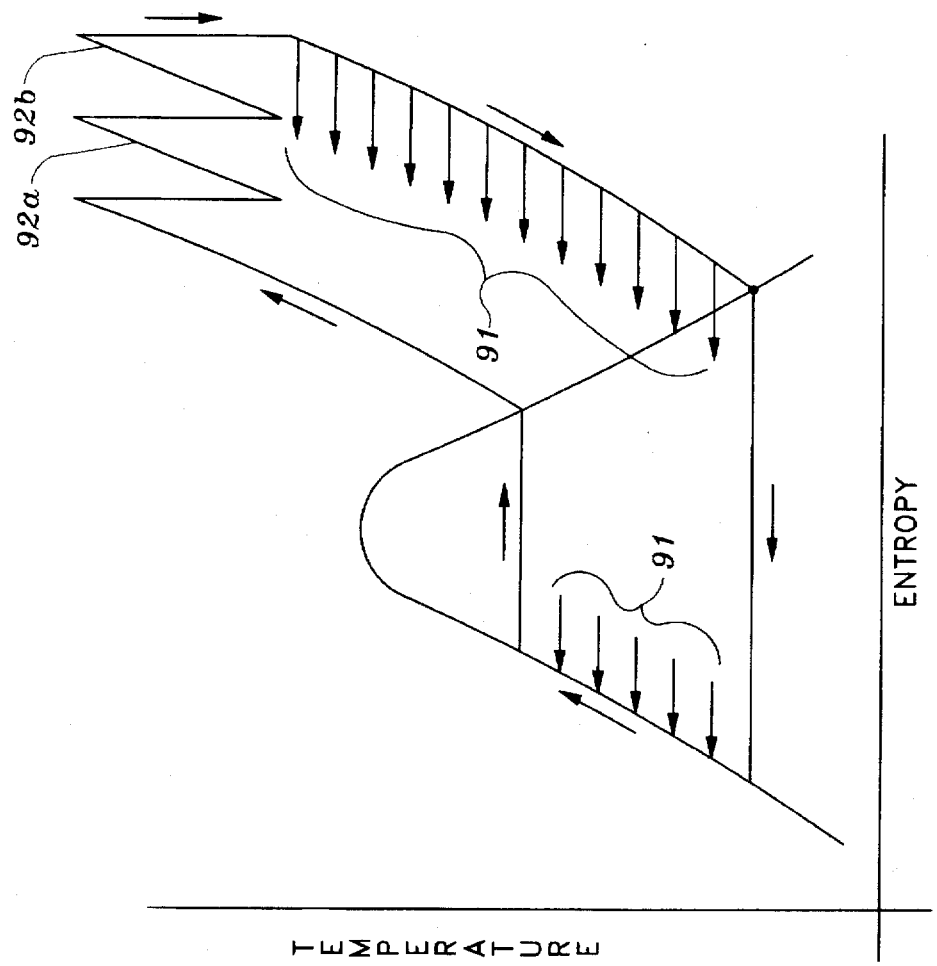
FIG. 7 is a plot of Temperature v. Entropy for the working fluid for the power cycle used for the thermal engines shown in FIG. 5 and FIG. 6. This cycle features the Rankine cycle with regeneration and reheat for improved performance.

A fifth embodiment of this invention, illustrated in FIG. 6, includes all the elements of the second embodiment and adds two reheaters 150 and 160 to improve the performance. This engine operates as described for embodiment four except this engine uses hydrogen fuel. The Rankine cycle of these embodiments using regeneration and reheats is illustrated in FIG. 7. Regeneration is illustrated by 91 and the two reheats are illustrated by 92a and 92b.

Figure 8:
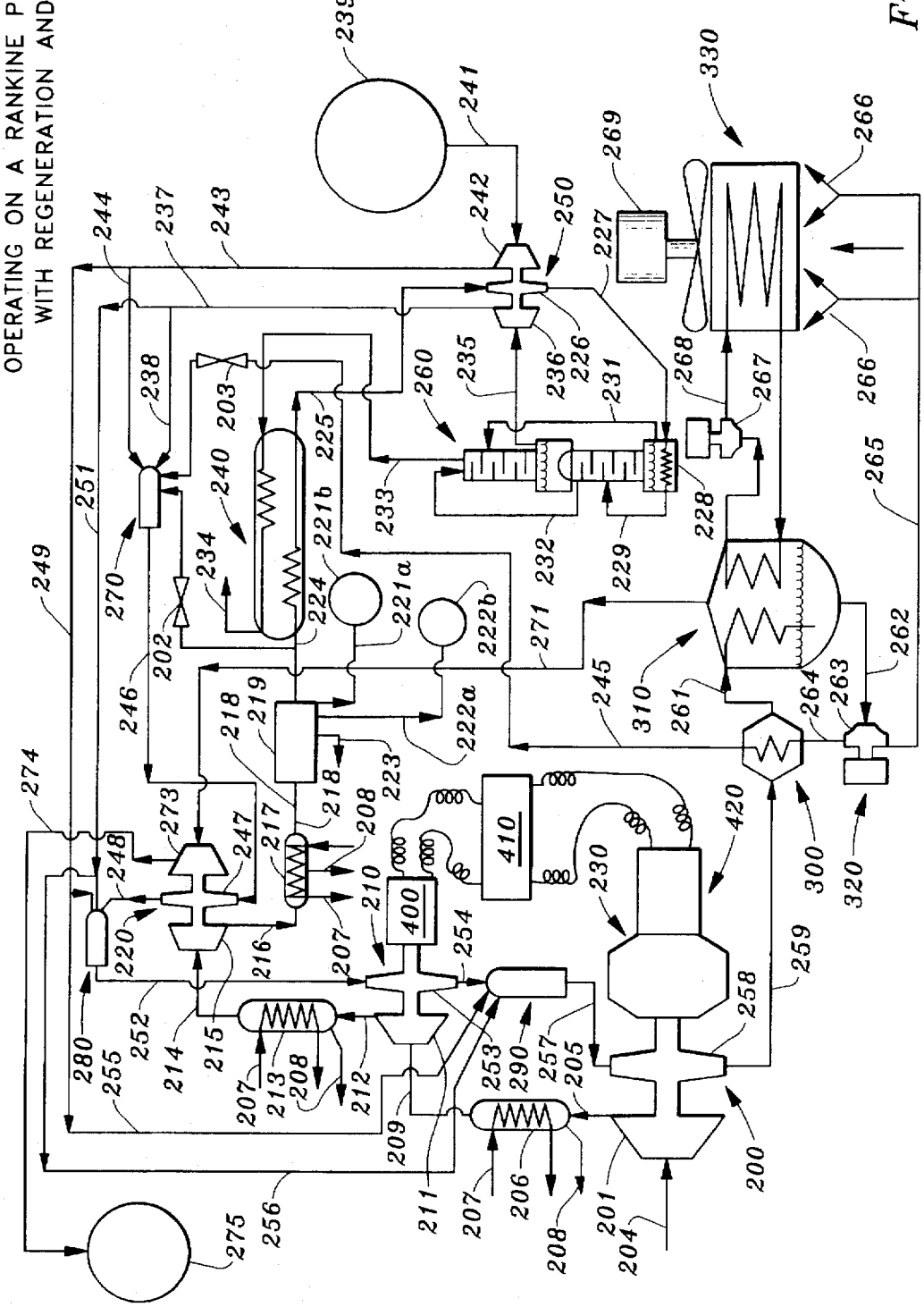
FIG. 8 is a schematic illustrating an embodiment of this invention that features a non-polluting hybrid engine with electric motor drive and a Rankine power cycle utilizing dynamic type turbomachinery. The Rankine power cycle utilizes regeneration and reheaters for increased cycle efficiency and power density.

A sixth embodiment of this invention; illustrated in FIG. 8, is similar to the fourth embodiment featuring reheaters, illustrated in FIG. 5, except all the machinery consists of dynamic type compressors and turbines. This type of machinery is more suitable for higher power levels (>1000 SHP) required for rail, ship or standby power systems.

The Rankine engine consists of dynamic turbocompressors 200, 210, and 220, a power transmission 230, a heat exchanger 240, a turboexpander 250, a rectifier 260, a gas generator 270, a first reheater 280, a second reheater 290, a water heater 300, a condenser 310, a recirculating pump 320 and a condenser coolant radiator 330. The electric engine consists of an alternator 400, a battery 410 and electric motor 420.

Engine operation begins by starting the electric motor 420 using the battery 410 as the energy source. The electric motor 420 drives the dynamic compressor 201 through power transmission 230, and simultaneously, valve 202 is opened and valve 203 is closed. This initiates the start of the engine in a Brayton cycle mode. As engine speed increases valve 202 is gradually closed and valve 203 is gradually opened to slowly transition into the Rankine cycle mode and permit the liquefaction equipment to chill down. During this transitional period the electric motor 420 is used to maintain scheduled power and speed until steady state Rankine cycle conditions are achieved.

During thermal engine activation air enters turbocompressor 201 through duct 204 and is raised to the design discharge pressure. The air then exits through duct 205 into intercooler 206 where the heat of compression is removed by external cooling means 207 (i.e. air, water, Freon, etc.). Condensed water vapor is tapped-off by drain 208. After the air exits intercooler 206 through duct 209 at a temperature equal to the compressor inlet, it enters compressor 211 and is raised to the design discharge pressure. The air then exits through duct 212 into intercooler 213 and is again cooled to the inlet temperature of the compressor 201. This compression/cooling cycle is repeated as the air exits intercooler 213 through duct 214, enters compressor 215, then exits through duct 216, enters intercooler 217 and exits through duct 218 to complete the air pressurization.

The high pressure ambient temperature air then enters scrubber 219 where gases and fluids that are subject to freezing during the liquefaction process are removed (i.e. carbon dioxide, water vapor and oil). Carbon dioxide exits through duct 221a and is processed and stored in reservoir 221b. Oil is drained through duct 222a and stored in reservoir 222b. Water vapor is drained through duct 223 and discharged overboard.

The dry air then exits through duct 224 and enters the heat exchanger 240 where the air is cooled by returning gaseous nitrogen. It then exits through duct 225 and enters turboexpander 226 where the air temperature is further reduced to near liquid air temperature prior to exiting through duct 227 and enters the rectifier 260. The air exits from the rectifier heat exchanger 228 through duct 229 at liquid air temperature and enters the rectifier's lower column plates where oxygen/nitrogen separation is initiated. Liquid with 40% oxygen exits through duct 231 and enters the upper rectifier column where a higher percentage oxygen concentration is generated. Liquid nitrogen at 96% purity is recirculated from the lower rectifier column to the upper column by means of duct 232. Gaseous nitrogen at 99% purity (1% argon) exits through duct 233 and enters the heat exchanger 240 where cooling the incoming dry air is performed prior to discharging through duct 234 to the atmosphere at near ambient temperature and pressure. Gaseous oxygen or liquid oxygen at 95% purity (5% argon) exits through duct 235 and enters the turboexpander compressor 236 where the oxygen is pressurized to the design pressure. The high pressure oxygen then exits through duct 237 and enters the gas generator 270 through duct 238.

Fuel, i.e. methane, propane, purified natural gas and light alcohols such as methanol and ethanol, exits the fuel supply tank 239 through duct 241 and enters the compressor 242 of turboexpander 250 and is raised to the design discharge pressure. The pressurized fuel then exits through duct 243 and enters the gas generator 270 through duct 244 where it mixes with the incoming oxygen at stoichiometric mixture ratio to achieve complete combustion and maximum hot gas temperature (approximately 6500° R). The products of combustion of these reactants result in a high purity steam, carbon dioxide gas and a small amount of gaseous argon (4%).

Following complete combustion of the high temperature gases, recirculating water is injected into the gas generator through line 245 and dilutes the high temperature gases to a lower temperature drive gas acceptable to the dynamic turbine 247 (approximately 2000° R). The drive gas then exits the gas generator 270 through duct 246 and enters the turbine 247 of turbocompressor 220, where the gas expands and powers the air compressor 215 and the carbon dioxide compressor 273. The gas then exits through duct 248 and enters reheater 280 where the heat extracted due to the turbine 247 work is replenished. This heat is derived from the combustion of added fuel through duct 249 and added oxygen through duct 251 into reheater 280.

The reheated gas then exits through duct 252 and enters turbine 253 of turbocompressor 210 and expands to lower pressure. The power produced by these expanding gases drive the alternator 400 and compressor 211, then exhaust through duct 254 and enter reheater 290. The heat extracted from the gases resulting in the turbine work is replenished with the heat of combustion from added fuel through duct 255 and oxygen through duct 256.

The reheated gas then exits through duct 257, enters turbine 258 of turbocompressor 200 and drives compressor 201 and power transmission 230. The turbine exhaust gas then exits through duct 259 and enters water heater 300 where the residual heat of the turbine 258 exhaust is used to preheat the water that is being recirculated to the gas generator 270. The gas then exits through duct 261, enters the condenser 310 near or below atmospheric pressure, where condensation of the steam into water and separation of the carbon dioxide gas occurs.

The condensed water exits through line 262, enters the pump 263 where the pressure is raised to the supply level of the gas generator 270. A major portion of the discharge water from pump 263 exits through line 264, enters the water heater 300 where heat is absorbed from the turbine exhaust gas and then exists through line 245 for delivery to the gas generator 270. The remaining water from the discharge of pump 263 exits through line 265 and is sprayed through nozzles 266 into radiator 330 for evaporative cooling. Coolant for the condenser gas is recirculated by pump 267 to the radiator 330 through line 268, where heat is rejected to atmospheric air being pumped by fan 269.

The gaseous carbon dioxide, remaining from the condensation of steam, exits through duct 271 and enters compressor 273 of turbocompressor 220 and is compressed to slightly above atmospheric pressure (when condenser pressure is below atmospheric) and discharged through duct 274 into storage tank 275. The compressed carbon dioxide can be converted into a liquid or solid state for periodic removal, or the gas can be discharged into the atmosphere as local environmental laws permit.

Figure 9:
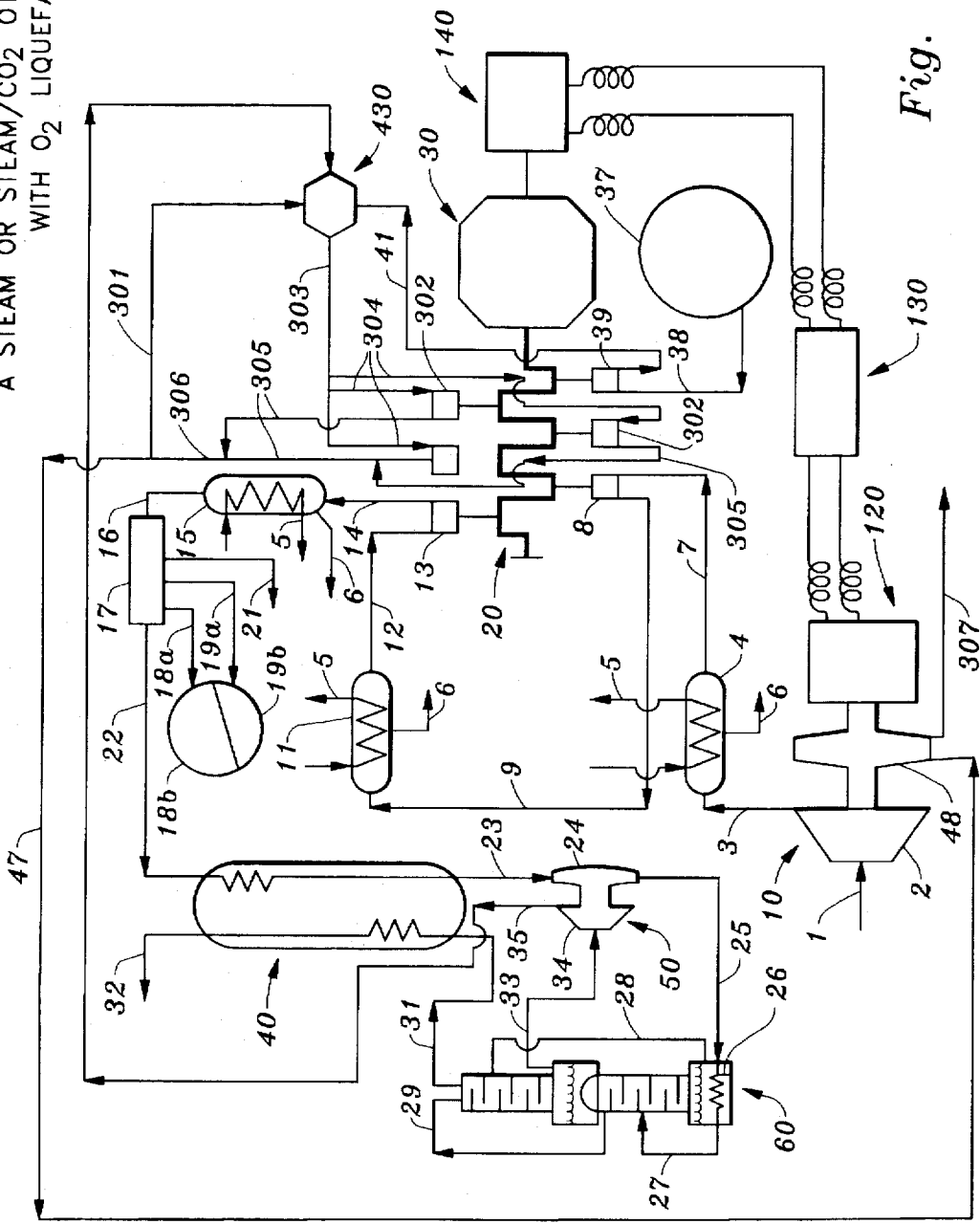
FIG. 9 is a schematic illustrating an embodiment of this invention that features a low-polluting hybrid engine with an electric motor drive and an Otto power cycle reciprocating engine.

The seventh embodiment of this invention, illustrated in FIG. 9, includes the liquefaction system of the previous embodiments but utilizes the intermittent but spontaneous combustion process of the Otto cycle as the thermal power engine. This embodiment eliminates the need for the steam condenser and the recirculating water system.

The Otto cycle stem or steam/CO2 thermal engine consists of, in addition to the liquefaction system previously described, a premixer 430 where oxygen from duct 35, fuel from duct 41 and recirculating steam or steam/CO2 from duct 301 are premixed in the approximate ratio of 20%, 5% and 75% by weight respectively. These premixed gases are then directed to the reciprocating pistons 302 through duct 303 and ducts 304 where they are compressed and ignited with a spark ignition system identical to current Otto cycle engines. After the power stroke, the steam or steam/CO2 gases are discharged to the dynamic turbine 48 through ducts 305, 306 and then into duct 47. Some of the discharge gases are directed back to the premixer 430 through duct 301. The exhaust gases from the dynamic turbine 48 are then discharged to the atmosphere through duct 307.

Figure 10:
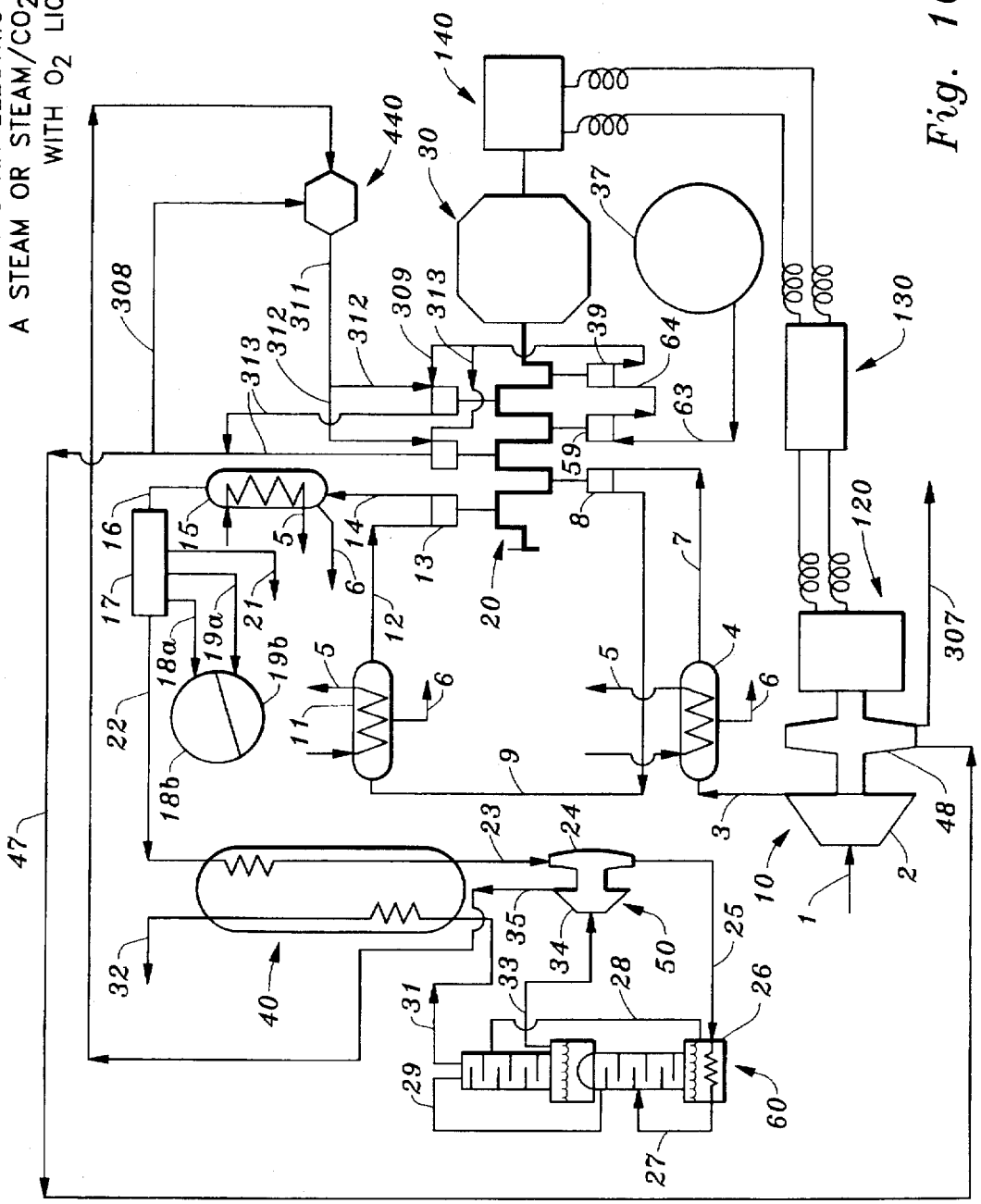
FIG. 10 is a schematic illustrating an embodiment of this invention that features a low-polluting hybrid engine with an electric motor drive and a Diesel power cycle reciprocating engine.

The eighth embodiment of this invention, illustrated in FIG. 10, is similar to the seventh embodiment, except a Diesel power cycle is used. In this system a premixer 440 mixes the oxygen from duct 35 with steam or steam/CO2 from duct 308, at an approximate mixture ratio of 23% and 77% by weight respectively, and discharges the gaseous mixture to the reciprocating pistons 309 through duct 311 and ducts 312 where the mixture is compressed to a high pre-ignition temperature. The high pressure fuel, at approximately 5% of the total weight of the gas mixture in the piston cylinder, is injected through ducts 313 and burns at approximately constant pressure. If necessary, an ignition device is located within the combustion cylinder. The hot gases then rapidly expand as the piston moves to the bottom of its power stroke. The steam/CO2 gases are then discharged into ducts 313 and delivered to the dynamic turbine 48 through duct 47. Some of the discharged gases are diverted to the premixer 440 through the duct 308. The exhaust gases from the dynamic turbine 48 are then discharged into the atmosphere through duct 307.

What is claimed is:

1. A hybrid engine consisting of an electric motor drive in parallel with a non-polluting regenerative Rankine cycle engine using as the working fluid the products of complete combustion of oxygen and a hydrocarbon or simple alcohol (i.e. methanol or ethanol), combined with a water quench, said hybrid engine comprising:

an electric motor means connected to a power transmission means, said electric motor means receives its electric current from a battery means, said battery receives its electric current from an alternator means, said alternator is driven by a dynamic turbine means;

a dynamic compressor means having an inlet adapted to receive air from a supply and having a discharge, said dynamic compressor including a means to raise the pressure of said air to a value greater than at said inlet;

a first intercooler means including means for receiving said air from said dynamic compressor discharge and having an output and said intercooler including means to cool said air;

a reciprocating compressor means having an inlet adapted to receive air from said first intercooler output and having a discharge, said reciprocating compressor including a means to raise said pressure of the said air to a value greater than at said inlet;

a second intercooler means including means for receiving said air from said reciprocating compressor discharge and having an output and said second intercooler means including means to cool said air;

a scrubber means, including means for receiving said air from said second intercooler output and having an output, said scrubber having means to remove carbon dioxide, water, water vapor and oil form the air;

a heat exchanger means having an input adapted to receive said air from said scrubber output and having an output and said heat exchanger in fluid communication with gaseous nitrogen cooling means;

a turbo-expander means having an input to receive said air from the heat exchanger output and having an exhaust and said turbo-expander including means to reduce the pressure of said air to a value lower than at said input;

a rectifier means having an input adapted to receive said air from said turbo-expander exhaust and having a gaseous nitrogen output and a gaseous oxygen output and said rectifier having a means to separate the gaseous nitrogen and gaseous oxygen from the said air;

said heat exchanger having a gaseous nitrogen inlet adapted to receive said gaseous nitrogen from said rectifier output and having a gaseous nitrogen output;

a turbo-expander driven dynamic compressor means adapted to receive said gaseous oxygen from said rectifier output and having a discharge, said turbo-expander driven dynamic compressor including means to raise the pressure of said gaseous oxygen to a value greater than at its inlet;

a reciprocating compressor means having an inlet adapted to receive a hydrocarbon type fuel from a supply means and having a discharge and said reciprocating compressor including a means to raise said fuel pressure to a value greater than at said inlet;

a high pressure water pump means having an inlet adapted to receive lower pressure water from a supply means and having a discharge and said pump including means to raise the pressure of said water to a value greater than at said inlet;

a gas generator means, including inlet means for receiving said oxygen from said turbo-expander driven dynamic compressor discharge, said high pressure fuel from said reciprocating compressor discharge and hot water from a high pressure hot water heater output, means to completely combust said high pressure oxygen with said high pressure fuel to generate a high temperature gas of steam and carbon dioxide, means to quench said high temperature gas with said high pressure water to generate a lower temperature mixture of steam and carbon dioxide gas and having an output;

a reciprocating turbine means having an input adapted to receive said gas generator output gas, adapted to deliver power to said power transmission connected to said electric motor, and having an exhaust and said reciprocating turbine including a means to lower the pressure of said gas to a value lower than at said input;

a dynamic turbine connected to said dynamic air compressor, including input means to receive said gas from said reciprocating turbine exhaust and have an exhaust, said dynamic turbine including means to lower the gas pressure to a value lower than at said input and said dynamic turbine also connected to said alternator to generate electricity for said electric motor battery;

the said water heater means including inlet means for receiving said gas from the said dynamic turbine exhaust, means for receiving cold water from high pressure supply means, means to transfer the said gas heat to the said water and having a gas output and a high pressure hot water output;

a condenser means including input means to receive the water heater output gas, means to receive a coolant from a radiator output, means to transfer heat from said gas to said coolant to condense the steam into water and separate the carbon dioxide gas and output means to discharge the said condensed water, said carbon dioxide gas and said heated coolant;

a pump means including and inlet adapted to receive said condenser output water, means to raise said water pressure to a value greater than at said inlet and have a discharge for said water heater cold water inlet and a discharge for radiator evaporative cooling water;

the said radiator means including means for receiving said condenser warm coolant output, means to cool the warm coolant with ambient air, means for evaporative cooling the ambient air with spray nozzles using said pump evaporative cooling discharge water, and output means to discharge said coolant and a fan means to circulate said ambient air to absorb heat from said condenser coolant;

a reciprocating compressor means including inlet means to receive gaseous carbon dioxide from the said condenser output and having a discharge, means to raise the said carbon dioxide pressure to a value greater than at said inlet;

a carbon dioxide conversion and storage means including means for receiving the reciprocating compressor carbon dioxide discharge and means to convert the carbon dioxide into a compact liquid or solid state for periodic removal.

2. A low or no pollution emitting combustion engine to provide power for various applications such as vehicle propulsion, the engine comprising in combination:

an air inlet configured to receive air from an environment surrounding said engine;

a source of fuel at least partially including hydrogen;

an air treatment device including an inlet coupled to said air inlet, a means to remove nitrogen from the air, so that the air is primarily oxygen, and an oxygen outlet;

a fuel combustion device, said fuel combustion device receiving fuel from said source of fuel and oxygen from said outlet of said air treatment device, said combustion device combusting said fuel with said oxygen to produce elevated pressure and elevated temperature combustion products including steam, said combustion device having a discharge for said combustion products; and a combustion product expansion device coupled to said discharge of said combustion device, said expansion device including means to output power from said engine and an exhaust for said combustion products.

3. The engine of claim 2 wherein said engine includes a means to compress the oxygen and the fuel before the oxygen and the fuel enter said combustion device.

4. The engine of claim 3 wherein said combustion device includes a water inlet, said water inlet configured to receive water from at least one source which includes water originally created as one of said combustion products exiting said combustion chamber, said water inlet placing water into contact with said combustion products for mixing with said combustion products and output through said discharge of said combustion device, whereby a temperature of gases exiting said combustion device through said discharge is decreased and a mass flow rate of gases exiting said combustion device through said discharge is increased.

5. The engine of claim 4 wherein said means to compress the oxygen includes at least two compressors, each said compressor including an intercooler therebetween, at least two of said compressors oriented between said air inlet and said air treatment device, such that the oxygen is compressed along with other constituents of the air entering the air inlet.

6. The engine of claim 5 wherein at least a portion of said combustion products exiting said exhaust of said combustion product expansion device are routed to a condenser where the steam within said combustion products is condensed to water, said condenser including a return duct to said water inlet of said combustion device, whereby the steam/water acts as a working fluid for a Rankine cycle.

7. The engine of claim 6 wherein each of said compressors are coupled to an electric motor and battery such that said electric motor and battery can drive said compressors for compression of the oxygen, and wherein each of said compressors are also coupled to at least one expander in fluid communication with said combustion products exiting said discharge of said combustion device, such that said expanders can drive said compressors for compression of the oxygen, and wherein said electric motors include means to charge said battery when said expanders deliver excess power beyond that necessary to drive said compressors for compression of the oxygen.

8. The engine of claim 2 wherein at least one compressor is oriented between said air inlet and said air treatment device, raising a pressure of the air, wherein at least one intercooler is oriented between a first said compressor and said air treatment device, each said intercooler reducing a temperature of the air passing therethrough, and wherein said air treatment device includes an expander downstream from a last said intercooler, said expander reducing a pressure of the air and a temperature of the air to below a condensation point of the oxygen within the air, said air treatment device including said oxygen outlet substantially free of nitrogen.

9. The engine of claim 8 wherein said air treatment device includes a nitrogen outlet, and wherein said engine includes a heat transfer device including means to transfer heat between nitrogen exiting said air treatment device through said nitrogen outlet and air between said expander and said air inlet.

10. The engine of claim 9 wherein said expander is coupled to an oxygen compressor interposed between said oxygen outlet of said air treatment device and said combustion device, whereby a pressure of the oxygen is increased.

11. The engine of claim 10 wherein a scrubber is provided between said air treatment device and said air inlet to remove gases capable of freezing from the air.

12. The engine of claim 11 wherein said air treatment device includes a two column rectifier downstream from said expander, said rectifier including said oxygen outlet and said nitrogen outlet.

13. The engine of claim 7 wherein at least one of said compressors is oriented between said air inlet and said air treatment device, raising a pressure of the air;

wherein at least one intercooler is oriented between a first said compressor and said air treatment device, each said intercooler reducing a temperature of the air passing therethrough;

wherein said air treatment device includes an expander downstream from a last said intercooler, said expander reducing a pressure of the air and a temperature of the air to below a condensation point of the oxygen within the air, said air treatment device including said oxygen outlet substantially free of nitrogen;

wherein said air treatment device includes a nitrogen outlet, and wherein said engine includes a heat transfer device including means to transfer heat between nitrogen exiting said air treatment device through said nitrogen outlet and air between said expander and said air inlet;

wherein said expander is coupled to an oxygen compressor interposed between said oxygen outlet of said air treatment device and said combustion device, whereby a pressure of the oxygen is increased;

wherein a scrubber is provided between said air treatment device and said air inlet to remove gases capable of freezing from the air; and wherein said air treatment device includes a two column rectifier downstream from said expander, said rectifier including said oxygen outlet and said nitrogen outlet.

14. The engine of claim 2 wherein said fuel is a hydrocarbon fuel including hydrogen, carbon and possibly oxygen, wherein said fuel and said oxygen are provided at a stoichiometric ratio needed to produce said combustion products including substantially only steam and carbon dioxide.

15. The engine of claim 14 wherein at least a portion of said combustion products exiting said exhaust of said combustion product expansion device are routed to a condenser where the steam within said combustion products is condensed to water, said condenser including a first return duct to said water inlet of said combustion device, whereby the steam/water acts as a working fluid for a Rankine cycle;

wherein said condenser includes a heat transfer fluid therein for removal of heat from the steam, said heat transfer fluid in fluid communication with an interior of a radiator oriented in the environment surrounding said engine with air from the surrounding environment passing against an exterior of said radiator and cooling said heat transfer fluid therein; and wherein said condenser includes a second outlet water duct spraying water into the surrounding environment and against said exterior of said radiator for evaporative cooling of said heat transfer fluid within said radiator.

16. A combustion engine providing clean power for various applications and featuring low NOx production, comprising in combination:

a source of air, the air including nitrogen and oxygen;

a source of fuel, the fuel including hydrogen;

an air treatment device having an inlet coupled to said source of air, and having an outlet, said air treatment device including means to remove at least a portion of the nitrogen from the air entering said inlet;

a fuel combustion device, said fuel combustion device receiving fuel from said source of fuel and air from said outlet of said air treatment device, said combustion device combusting said fuel with the air to produce elevated pressure and elevated temperature combustion products including steam, said combustion device having a discharge for said combustion products; and a combustion product expansion device coupled to said discharge of said combustion device, said expansion device including means to output power from said engine.

17. The engine of claim 16 wherein said air treatment device includes an outlet for excess nitrogen removed by said nitrogen removal means, and wherein a heat exchanging device is interposed between said excess nitrogen outlet of said air treatment device and said source of air, said heat exchanging device including means to cool the air from said source of air with the excess nitrogen, without direct contact between the air from said source of air with the excess nitrogen.

18. The engine of claim 17 wherein said engine includes a means to compress the air from said source of air, said expansion device configured to power said air compression means.

19. The engine of claim 18 wherein said expansion device includes an exhaust for said combustion products, said exhaust including a means to separate at least a portion of a steam constituent of said combustion products and means to collect any other combustion products, such that only water is discharged from said engine.

20. The engine of claim 18 wherein said engine includes a recirculation pathway interposed between said exhaust and said fuel combustion device, said recirculation pathway providing a means to utilize the combustion products from said exhaust to reduce a temperature and increase a mass flow rate of gases exiting said discharge of said fuel combustion device.

* * * * *